(12) United States Patent
Miyata et al.

(10) Patent No.: US 6,581,962 B2
(45) Date of Patent: Jun. 24, 2003

(54) ACTIVATION CONTROL APPARATUS AND METHOD OF AIRBAG APPARATUS

(75) Inventors: Yujiro Miyata, Toyota (JP); Tomoki Nagao, Nagoya (JP); Katsuji Imai, Nagoya (JP); Motomi Iyoda, Seto (JP); Seiya Ide, Okazaki (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 0 days.

(21) Appl. No.: 09/920,718

(22) Filed: Aug. 3, 2001

(65) Prior Publication Data

US 2002/0024207 A1 Feb. 28, 2002

(30) Foreign Application Priority Data

Aug. 24, 2000 (JP) ........................................ 2000-254470

(51) Int. Cl.[7] .............................................. B60R 21/32
(52) U.S. Cl. .......................................... 280/735; 701/45
(58) Field of Search ........................... 280/735; 701/45; 180/282

(56) References Cited

U.S. PATENT DOCUMENTS

| 5,914,653 | A |   | 6/1999  | Takeuchi et al. |         |
|-----------|---|---|---------|-----------------|---------|
| 5,961,562 | A |   | 10/1999 | Iyoda           |         |
| 5,967,548 | A | * | 10/1999 | Kozyreff        | 180/282 |
| 5,995,892 | A |   | 11/1999 | Kiribayashi et al. |      |
| 6,023,664 | A |   | 2/2000  | Bennet          |         |
| 6,157,880 | A | * | 12/2000 | de Mersseman et al. | 280/728.3 |
| 6,170,864 | B1 | * | 1/2001 | Fujita et al. | 315/198 |
| 6,196,578 | B1 | * | 3/2001 | Iyoda | 280/735 |
| 6,198,997 | B1 | * | 3/2001 | Ishikawa et al. | 180/282 |
| 6,236,921 | B1 | * | 5/2001 | McConnell | 280/735 |
| 6,236,922 | B1 |   | 5/2001 | Andres |  |
| 6,347,268 | B1 | * | 2/2002 | Fujita et al. | 280/735 |
| 6,371,515 | B1 | * | 4/2002 | Fujishima et al. | 180/282 |
| 6,426,567 | B2 | * | 7/2002 | Ugusa et al. | 280/735 |
| 6,430,489 | B1 | * | 8/2002 | Dalum | 280/735 |

FOREIGN PATENT DOCUMENTS

| JP | A-10-152014 | 6/1998 |
| JP | A-11-286257 | 10/1999 |

* cited by examiner

Primary Examiner—Kevin Hurley
Assistant Examiner—L. Lum
(74) Attorney, Agent, or Firm—Kenyon & Kenyon

(57) ABSTRACT

A satellite sensor and a floor sensor are provided in a forward portion and a central portion, respectively, of a vehicle body. A calculated value and a speed are determined through predetermined processing of a deceleration detected based on an output signal of the floor sensor. If a value determined from the relationship between the calculated value and the speed exceeds a predetermined threshold changing pattern, an airbag apparatus is activated. The threshold changing pattern is set by selecting a map from a Hi map, a Lo1 map, a Lo2 map and a Lo3 map based on a deceleration determined from an output signal of the satellite sensor. If a map different from the current map is to be set as a threshold changing pattern, the threshold changing pattern is set to the desired map after a state that allows the map to be set continues for a time corresponding to a difference between the two maps.

18 Claims, 6 Drawing Sheets

ACTIVATION CONTROL APPARATUS AND METHOD OF AIRBAG APPARATUS

INCORPORATION BY REFERENCE

The disclosure of Japanese Patent Application No. 2000-254470 filed on Aug. 24, 2000 including the specification, drawings and abstract is incorporated herein by reference in its entirety.

BACKGROUND OF THE INVENTION

1. Field of the Invention

The invention relates to an activation control apparatus and method of an airbag apparatus and, more particularly, to an airbag apparatus activation control apparatus and method that is suitable in properly activating an airbag apparatus for protecting an occupant at the time of a collision a vehicle.

2. Description of the Related Art

An activation control apparatus of an airbag apparatus is conventionally known which has a floor sensor that is disposed in a floor tunnel of a vehicle body and that outputs a signal corresponding to the impact that occurs on the floor tunnel, and which deploys an airbag when the value of a parameter based on the output signal of the floor sensor exceeds a threshold, as disclosed in, for example, Japanese Patent Application Laid-Open No. HEI 11-286257. This apparatus further has a satellite sensor that is disposed in a forward portion of the vehicle body and that outputs a signal corresponding to the impact received by the forward portion of the vehicle body. The apparatus increases the amount of reduction of the aforementioned threshold with increases in the impact received by the forward portion of the vehicle body that is detected based on the output signal of the satellite sensor. Therefore, the airbag is deployed more easily if the impact that occurs on the forward portion of the vehicle body is greater. Thus, according to the above-described conventional apparatus, the airbag apparatus for protecting an occupant can be appropriately activated.

In the above-described conventional apparatus, the threshold for deploying the airbag is reduced by a greater amount if the impact given to the forward portion of the vehicle body that is detected based on the output signal of a satellite sensor is greater. In some cases, noises are superimposed on the output signal of the satellite sensor. If in such a case, it is determined that the impact given to the forward portion of the vehicle body is great, and therefore the threshold is immediately reduced, and the airbag becomes prone to be deployed. Thus, there arises a danger of inadvertent deployment of the airbag. Therefore, in view of proper deployment of the airbag, it is not appropriate to immediately reduce the threshold to a value corresponding to the output signal of a satellite sensor if the output signal of the satellite sensor fluctuates merely for a short period. However, in the above-described conventional apparatus, no consideration is given with regard to a technique of switching values of the threshold for deployment of the airbag.

SUMMARY OF THE INVENTION

It is an object of the invention to provide an airbag apparatus activation control apparatus and method capable of properly activating an airbag apparatus even if a noise is superimposed on the output signal of a sensor for use for setting a threshold value for activation of the airbag apparatus.

A first aspect of the invention is an activation control apparatus of an airbag apparatus including a first sensor that is disposed at a predetermined position in a vehicle body and that outputs a signal corresponding to an impact that occurs on a vehicle, activation control means for activating the airbag apparatus if a parameter based on the signal outputted by the first sensor exceeds a predetermined threshold, a second sensor that is disposed forward of the predetermined position of the first sensor within the vehicle body and that outputs a signal corresponding to an impact that occurs on the vehicle, and threshold setting means for setting one value of at least three values as the predetermined threshold based on the signal outputted by the second sensor. The activation control apparatus further includes threshold switching means for, if while the one value of the at least three values has been set as the predetermined threshold by the threshold setting means, another value is to be set as the predetermined threshold, switching the predetermined threshold to the another value after a state where the another value is to be set as the predetermined threshold continues for a time corresponding to a difference between the one value and the another value.

According to the above-described first aspect, if one value has been set as a predetermined threshold for activation of the airbag apparatus, the predetermined threshold is switched to as the predetermined threshold after the state where the another value is to be set continues for a time corresponding to a difference between the one value and the another value. Therefore, under a circumstance where the predetermined threshold can considerably change due to noises being superimposed on the output signal of the second sensor, an event that the airbag apparatus suddenly becomes prone to be activated or suddenly becomes less prone to be activated is avoided. Hence, according to the invention, it becomes possible to substantially prevent inadvertent activation of the airbag apparatus even in a case where noises are superimposed on the output signal of the second sensor. Thus, the airbag apparatus can be properly activated.

A second aspect of the invention is an activation control apparatus of an airbag apparatus including a first sensor that is disposed at a predetermined position in a vehicle body and that outputs a signal corresponding to an impact that occurs on a vehicle, activation control means for activating the airbag apparatus if a parameter based on the signal outputted by the first sensor exceeds a predetermined threshold changing pattern, a second sensor that is disposed forward of the predetermined position of the first sensor within the vehicle body and that outputs a signal corresponding to an impact that occurs on the vehicle, and threshold changing pattern setting means for setting one changing pattern of at least three changing patterns as the predetermined threshold changing pattern based on the signal outputted by the second sensor. The activation control apparatus further includes threshold changing pattern switching means for, if while the one changing pattern of the at least three changing patterns has been set as the predetermined threshold changing pattern by the threshold changing pattern setting means, another changing pattern is to be set as the predetermined threshold changing pattern, switching the predetermined threshold changing pattern to the another changing pattern after a state where the another changing pattern is to be set as the predetermined threshold changing pattern continues for a time corresponding to a difference between the one changing pattern and the another changing pattern.

According to the second aspect, if while one changing pattern has been set as a predetermined threshold changing pattern, another changing pattern is to be set as the predetermined threshold changing pattern, the predetermined threshold changing pattern is switched to the another changing pattern after the state where the another changing pattern is to be set continues for a time corresponding to a difference between the one changing pattern and the another changing pattern. Therefore, under a circumstance where the predetermined threshold changing pattern can considerably change due to noises being superimposed on the output signal of the second sensor, an event that the airbag apparatus suddenly becomes prone to be activated or suddenly becomes less prone to be activated is avoided. Hence, according to the invention, it becomes possible to substantially prevent inadvertent activation of the airbag apparatus even in a case where noises are superimposed on the output signal of the second sensor. Thus, the airbag apparatus can be properly activated.

If an arrangement is adopted in which the predetermined threshold is switched from one value only after the state where another value is to be set continues for the time corresponding to a difference between the one value and the another value, or in which the predetermined threshold is switched from one changing pattern only after the state where another changing pattern is to be set continues for the time corresponding to a difference between the one changing pattern and the another changing pattern, the responsiveness of the switching of the predetermined threshold or the predetermined threshold changing pattern deteriorates, so that an event that the airbag apparatus is not properly activated may occur.

In the first aspect, the threshold switching means may switch the predetermined threshold stepwise at every predetermined time during a process in which a time of continuation of the state where the another value is to be set as the predetermined threshold reaches the time corresponding to the difference between the one value and the another value.

In the second aspect, the threshold changing pattern switching means may switch the predetermined threshold changing pattern stepwise at every predetermined time during a process in which a time of continuation of the state where the another changing pattern is to be set as the predetermined threshold changing pattern reaches the time corresponding to the difference between the one changing pattern and the another changing pattern.

If during a process of switching the predetermined threshold or the predetermined threshold changing pattern for activation of the airbag apparatus via the threshold switching means or the threshold changing pattern switching means, a state where another value is to be set as the predetermined threshold or another changing pattern is to be set as the predetermined threshold changing pattern discontinues, there is no need to switch the predetermined threshold or the predetermined threshold changing pattern to the another value or the another changing pattern.

Therefore, in the first aspect, the activation control apparatus may further include threshold switching aborting means for aborting switching of the predetermined threshold to the another value if the state where the another value is to be set as the predetermined threshold discontinues before the predetermined threshold is switched to the another value by the threshold switching means.

Likewise, in the second aspect, the activation control apparatus may further include threshold changing pattern switching aborting means for aborting switching of the predetermined threshold changing pattern to the another changing pattern if the state where the another changing pattern is to be set as the predetermined threshold changing pattern discontinues before the predetermined threshold changing pattern is switched to the another changing pattern by the threshold changing pattern switching means.

If an impact on the vehicle ends within a short time, the duration of fluctuation of the output signal of the second sensor usually becomes short. If the output signal of the second sensor fluctuates only for a short period, it becomes impossible to switch the threshold or the threshold changing pattern for activation of the airbag apparatus to a desired value or a desired changing pattern provided that the impact on the vehicle is great. Therefore, in order to reliably switch the threshold or the threshold changing pattern to a desired value or a desired changing pattern even if an impact on a forward portion of the vehicle body discontinues within a short time, it is appropriate to sufficiently lengthen the duration during which the second sensor outputs a signal corresponding to the impact given to the vehicle if the impact on the forward portion of the vehicle body discontinues in a short time.

Therefore, in the first and second aspects, the second sensor may continue to output a signal for at least a predetermined time.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
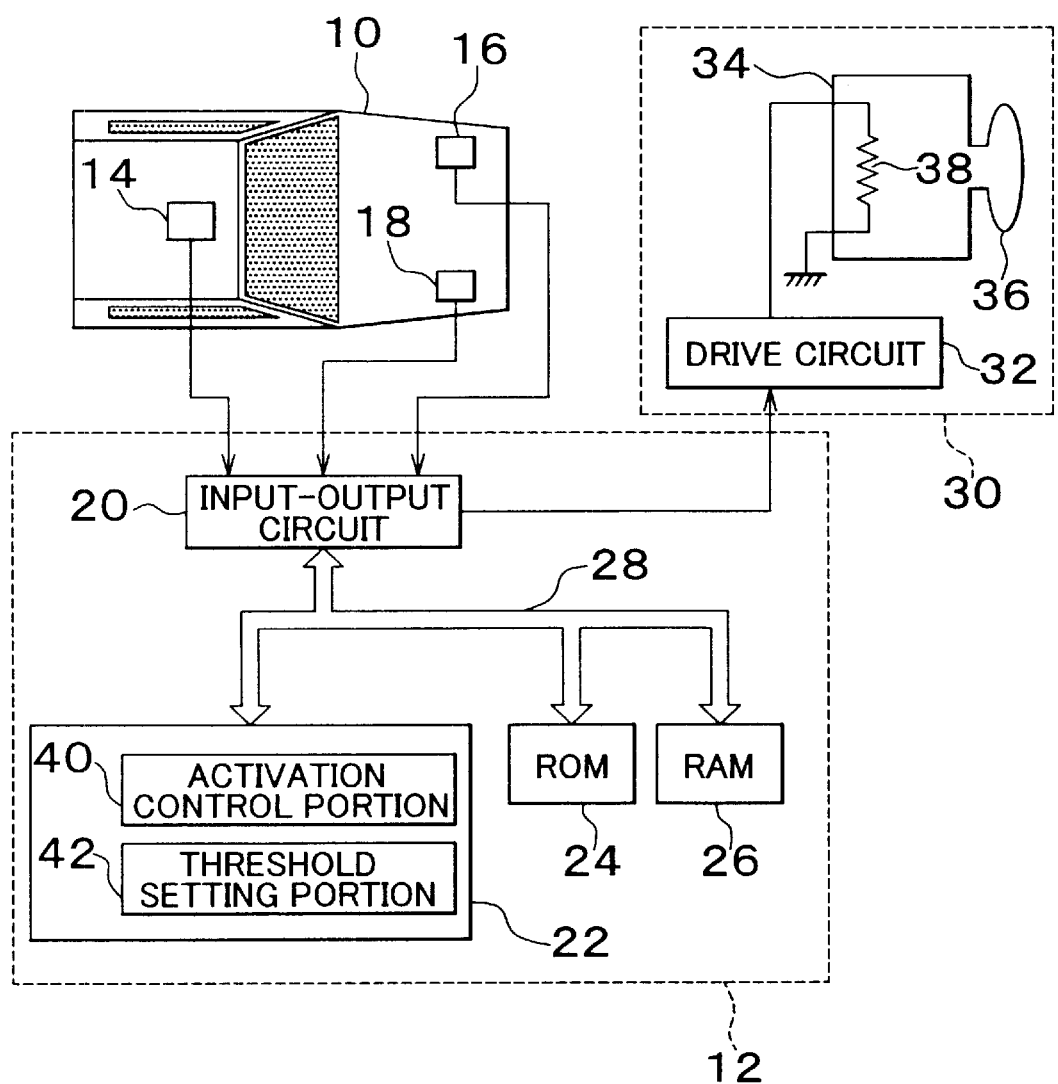
FIG. 1 is a diagram illustrating a system construction of an activation control apparatus of an airbag apparatus in accordance with an embodiment of the invention.

FIG. 1 is a diagram illustrating a system construction of an activation control apparatus of an airbag apparatus in accordance with an embodiment of the invention.

A system in this embodiment includes an electronic control unit (hereinafter, referred to as "ECU") 12 installed in a vehicle 10, and is controlled by the ECU 12.

The system of this embodiment includes a floor sensor 14 disposed near a floor tunnel extending in a central portion of a vehicle body, and satellite sensors 16, 18 disposed in left and right side members disposed in a forward portion of the vehicle body. Each of the floor sensor 14 and the satellite sensors 16, 18 is an electronic deceleration sensor that outputs a signal corresponding to the magnitude impact that occurs on the site where the sensor is disposed and, more specifically, a signal corresponding to the magnitude of deceleration in a fore-aft direction of the vehicle. The satellite sensors 16, 18 are designed so that if an impact on the vehicle 10 ends within a short time, the signals corresponding to the impact are continuously outputted at least for a predetermined time. Furthermore, each of the floor sensor 14 and the satellite sensors 16, 18 has a self-diagnostic function. If a sensor determines that the sensor has an abnormality, the sensor outputs a predetermined signal to the outside.

The ECU 12 is formed by an input-output circuit 20, a central processing unit (hereinafter, referred to as "CPU") 22, a read-only memory (hereinafter, referred to as "ROM") 24 in which processing programs and tables needed for calculations are pre-stored, a random access memory (hereinafter, referred to as "RAM") 26 for use as work areas, and a bidirectional bus 28 that connects these component elements.

The floor sensor 14 and the satellite sensors 16, 18 are connected to the input-output circuit 20 of the ECU 12. The output signals of the floor sensor 14 and the satellite sensors 16, 18 are separately supplied to the input-output circuit 20, and are suitably stored in the RAM in accordance with instructions from the CPU 22. The ECU 12 detects the magnitude Gf of deceleration that occurs on a central portion of the vehicle body based on the output signal of the floor sensor 14, and also detects the magnitudes $G_{SL}$, $G_{SR}$ of deceleration that occur on left and right forward portions of the vehicle body based on the output signals of the satellite sensors 16, 18. The ECU 12 determines whether any one of the sensors has a failure based on the output signal outputted from each sensor in accordance with a result of self-diagnosis.

The system of this embodiment further includes an airbag apparatus 30 that is installed in the vehicle 10 and that is operated so as to protect an occupant. The airbag apparatus 30 has a drive circuit 32, an inflator 34, and an airbag 36. The inflator 34 contains therein an igniter device 38 connected to the drive circuit 32, and a gas-producing agent (not shown) that produces a large amount of gas by using heat generated by the igniter device 38. The airbag 36 is inflated and deployed by the gas produced. The airbag 36 is disposed at a position such that when inflated and deployed, the airbag 36 comes into a space between an occupant in the vehicle 10 and component parts installed in the vehicle.

The drive circuit 32 of the airbag apparatus 30 is connected to the input-output circuit 20 of the ECU 12. The airbag apparatus 30 is activated to deploy the airbag 36 when a drive signal is supplied to the drive circuit 32 from the input-output circuit 20. The CPU 22 of the ECU 12 has an activation control portion 40 and a threshold setting portion 42. The activation control portion 40 of the CPU 22 calculates a predetermined parameter based on the deceleration Gf detected through the use of the floor sensor 14 as described below in accordance with a processing program stored in the ROM 24, and determines whether the parameter calculated exceeds a predetermined threshold SH. Furthermore, based on a result of the determination, the activation control portion 40 controls the supply of the drive signal from the input-output circuit 20 to the drive circuit 32 of the airbag apparatus 30. The threshold setting portion 42 appropriately sets the predetermined threshold SH for use in the activation control portion 40 based on the decelerations $G_{SL}$, $G_{SR}$ detected based on the output signals of the satellite sensors 16, 18.

Next described will be a content of processing executed by the CPU 22 in this embodiment.

Figure 2:
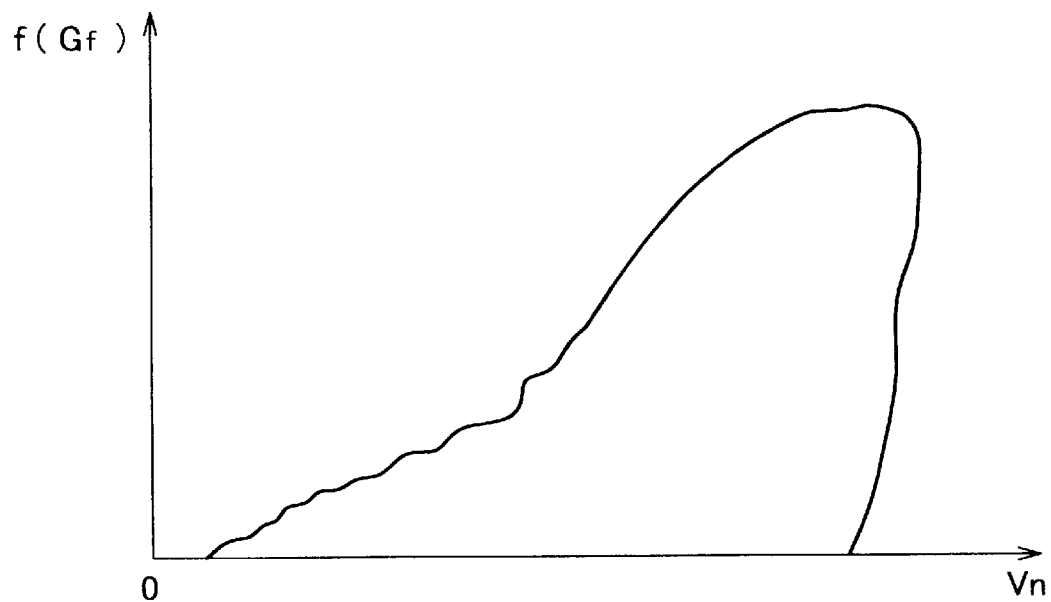
FIG. 2 is a diagram in which a relationship between the calculated value f(Gf) and the speed Vn under a predetermined circumstance is plotted at every predetermined time.

In this embodiment, the activation control portion 40 determines a calculated value f(Gf) and a speed Vn through predetermined calculation with the deceleration Gf detected based on the output signal of the floor sensor 14. More specifically, the speed Vn is a value obtained by time integration of the deceleration Gf. That is, if a deceleration Gf is applied to the vehicle 10 while the vehicle 10 is running, a mass in the vehicle (e.g., an occupant) accelerates forward relative to the vehicle 10 due to inertia. In such a case, therefore, the speed Vn of the mass present in the vehicle relative to the vehicle 10 can be determined through time integration of the deceleration Gf. The calculated value f(Gf) may be the deceleration Gf itself, or may also be a value obtained through time integration of the deceleration Gf with respect to unit time. FIG. 2 shows a diagram in which a relationship between the calculated value f(Gf) and the speed Vn under a predetermined circumstance is plotted at every predetermined time. After determining the calculated value f(Gf) and the speed Vn, the activation control portion 40 compares the magnitude of a value determined from the relationship between the calculated value f(Gf) and the speed Vn as indicated in FIG. 2 with the magnitude of the threshold SH, which has been set as a determination map by the threshold setting portion 42.

Figure 3:
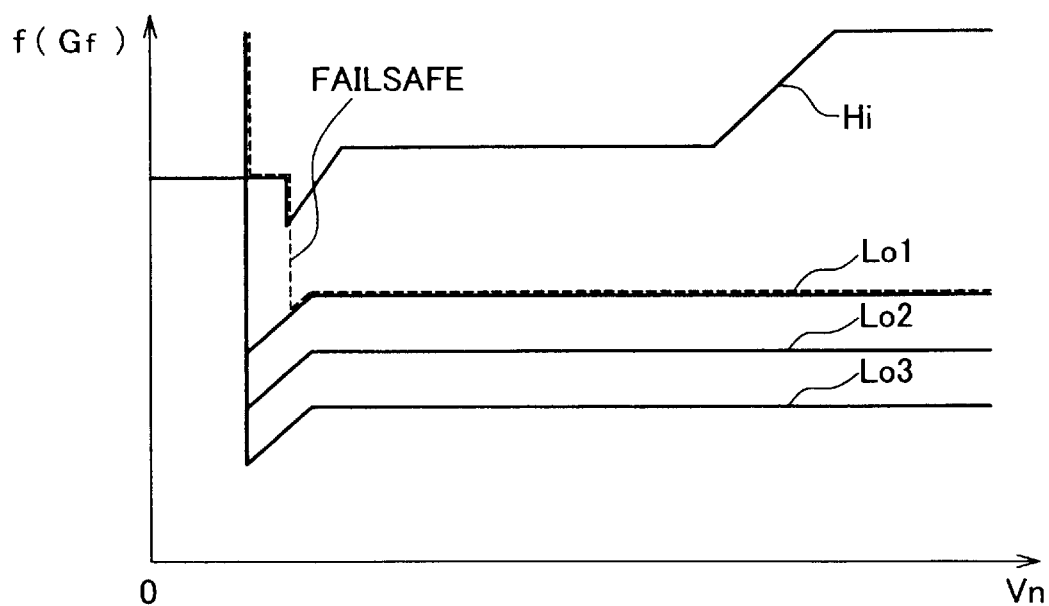
FIG. 3 is a diagram indicating changing patterns of a threshold SH that functions as a determination map for the relationship between the calculated value f(Gf) and the speed Vn in this embodiment.
Figure 4:
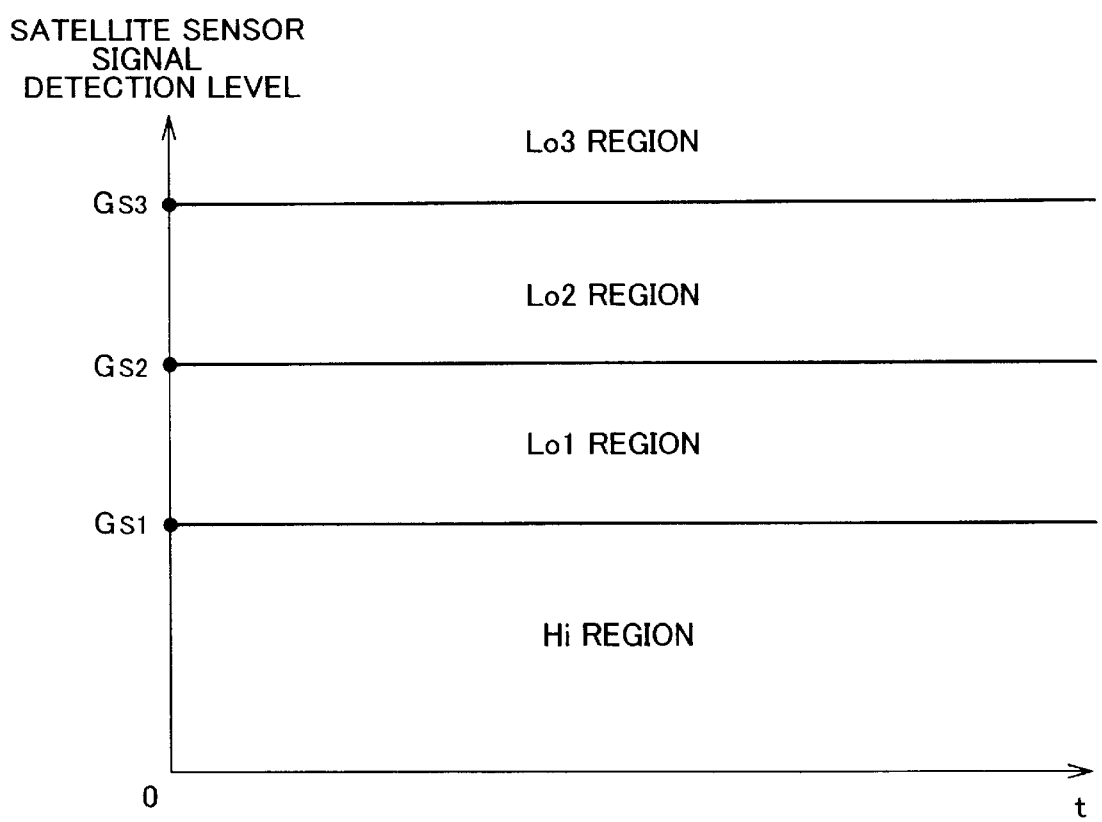
FIG. 4 is a diagram for illustrating a technique for setting a changing pattern of the threshold SH in this embodiment.

FIG. 3 shows a diagram indicating changing patterns of the threshold SH (hereinafter, referred to as "threshold changing patterns") that functions as a determination map for the relationship between the calculated value f(Gf) and the speed Vn in this embodiment. FIG. 3 indicates five threshold changing patterns, that is, a Hi map, a Lo3 map, a Lo2 map, a Lo1 map, and a failsafe map. In this embodiment, the Hi map is a map that serves as a reference, and the failsafe map partially overlaps the Lo3 map. FIG. 4 shows a diagram for illustrating a technique for setting a threshold changing pattern in this embodiment.

In this embodiment, the threshold setting portion 42 stores threshold changing patterns with regard to the relationship between the calculated value f(Gf) and the speed Vn that are empirically determined beforehand as indicated in FIG. 3. These threshold changing patterns are set on boundaries between a case where the airbag apparatus 30 needs to be activated upon an impact on the vehicle 10 and a case where there is no such need based on the decelerations $G_{SL}$, $G_{SR}$ based on the output signals of the satellite sensors 16, 18.

That is, if the impact given to a forward portion of the vehicle body is greater, the possibility of collision of the vehicle 10 is higher, so that it is appropriate to change threshold changing patterns so that the airbag apparatus 30 is more prone to be activated. In this embodiment, therefore, the threshold setting portion 42 selects and sets a threshold changing pattern in such a fashion that the threshold SH is reduced if the decelerations $G_{SL}$, $G_{SR}$ detected based on the output signals of the satellite sensors 16, 18 are greater. More specifically, if the decelerations $G_{SL}$, $G_{SR}$ are less than a first predetermined value $G_{S1}$, the Hi map is selected as a threshold changing pattern as indicated in FIG. 4. If the decelerations $G_{SL}$, $G_{SR}$ are equal to or greater than the first predetermined value $G_{S1}$ but are less than a second predetermined value $G_{S2}$, the Lo1 map is selected. If the decelerations $G_{SL}$, $G_{SR}$ are equal to or greater than the second predetermined value $G_{S2}$ but are less than a third predetermined value $G_{S3}$, the Lo2 map is selected. If the decelerations $G_{SL}$, $G_{SR}$ are equal to or greater than the third predetermined value $G_{S3}$, the Lo3 map is selected. If a failure occurs in the satellite sensor 16, 18 or an abnormality occurs in communication between the satellite sensors 16, 18 and the ECU 12, the failsafe map is selected. For the setting of a threshold changing pattern, the greater value of the two decelerations $G_{SL}$, $G_{SR}$ is used.

In the above-described construction, the activation control portion 40 supplies the drive signal from the input-output circuit 20 to the drive circuit 32 of the airbag apparatus 30 if comparison of the value determined from the relationship between the calculated value f(Gf) and the speed Vn with the threshold SH of the threshold changing pattern selected and set by the threshold setting portion 42 shows that the value determined from the relationship between the calculated value f(Gf) and the speed Vn is greater than the threshold SH. In this case, the airbag apparatus 30 is activated so as to deploy the airbag 36.

Thus, according to this embodiment, the threshold for activating the airbag apparatus 30 is changed in accordance with the impact given to a forward portion of the vehicle body. Therefore, it becomes possible to execute a suitable control of the activation of the airbag apparatus 30 in accordance with the fashion of collision of the vehicle 10, such as a head-on collision, an offset collision, a diagonal collision, etc. Hence, the airbag apparatus 30 is more easily activated if a greater impact occurs on a forward portion of the vehicle body. Thus, the airbag apparatus 30 can be properly activated.

In some cases, due to noises superimposed on the output signals of the satellite sensors 16, 18, the decelerations $G_{SL}$, $G_{SR}$ detected based on the output signals of the satellite sensors 16, 18 become great although the impact on the forward portion of the vehicle body is actually small. For example, an event may occur in which the deceleration $G_{SL}$, $G_{SR}$ immediately changes from a state where the deceleration is less than the first predetermined value $G_{S1}$ to a state where the deceleration is equal to or greater than the third predetermined value $G_{S3}$. If in a case where such an event occur, the threshold changing pattern is immediately changed from the Hi map to the Lo3 map, the airbag apparatus 30 becomes prone to be activated. Therefore, there arises a danger of inadvertent deployment of the airbag 36.

In general, noises as mentioned above do not continue for a long period, but discontinue within a short period. Therefore, an event that the airbag apparatus 30 becomes prone to be activated can be substantially avoided by, for example, adopting an arrangement in which if at least one of the decelerations $G_{SL}$, $G_{SR}$ immediately changes from the state of being less than the first predetermined value $G_{S1}$ to the state of being equal to or greater than the third predetermined value $G_{S3}$, the threshold changing pattern is switched from the Hi map to the Lo3 map after the state in which the deceleration $G_{SL}$, $G_{SR}$ is equal to or greater than the third predetermined value $G_{S3}$ has continued for a predetermined time. As a result, it becomes possible to properly deploy the airbag 36.

However, if the aforementioned arrangement in which the threshold changing pattern is switched from the Hi map to the Lo3 map after the state of the deceleration $G_{SL}$, $G_{SR}$ being at least the third predetermined value $G_{S3}$ has continued for the predetermined time, there arises a danger that an event that the airbag apparatus 30 is not activated despite a relatively great impact on the vehicle 10 may occur due to the relatively low responsive switching of the threshold changing pattern. Therefore, it is appropriate to switch the threshold changing pattern from the Hi map toward the Lo3 map (more specifically, to the Lo1 map or the Lo2 map) before the time of continuation of the state of the deceleration $G_{SL}$, $G_{SR}$ being at least the third predetermined value $G_{S3}$ reaches the predetermined time.

Therefore, the system of the embodiment is characterized in that if at least one of the decelerations $G_{SL}$, $G_{SR}$ detected based on the output signals of the satellite sensors 16, 18 greatly changes, the threshold changing pattern is sequentially changed by one step every time the deceleration $G_{SL}$, $G_{SR}$ continues for a predetermined time, and that if the deceleration $G_{SL}$, $G_{SR}$ continues for a time corresponding to a difference between an initial changing pattern and a desired changing pattern corresponding to the magnitude of the deceleration $G_{SL}$, $G_{SR}$, the desired threshold changing pattern is finally reached.

Characteristic portions of the embodiment will be described hereinafter with reference to FIGS. 5 to 7.

Figure 5A:
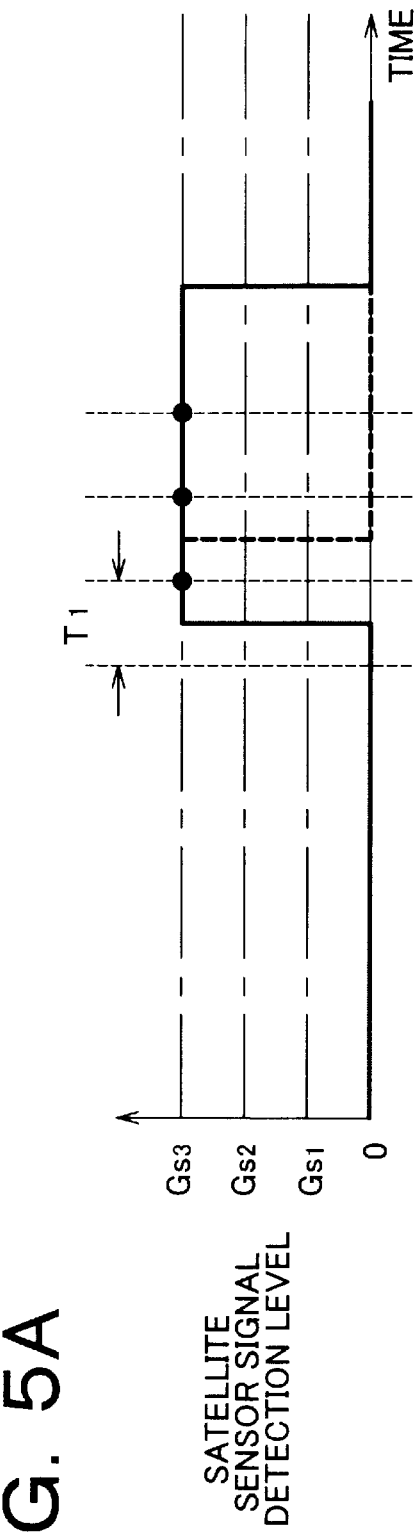
FIG. 5 are diagrams for illustrating the operation of switching the threshold changing pattern in the embodiment.
Figure 5B:
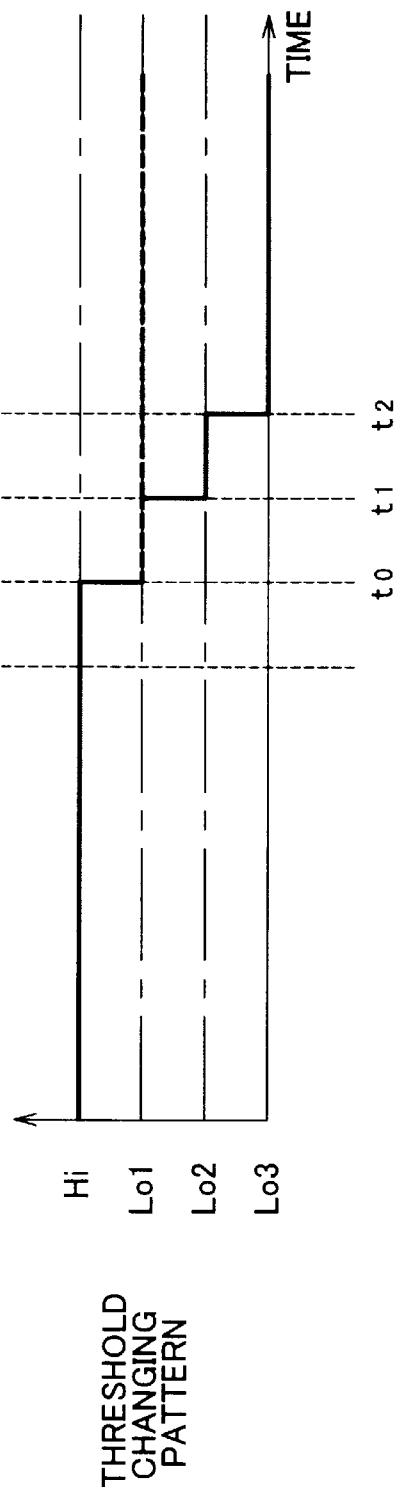

FIGS. 5A and 5B show diagrams for illustrating an operation of switching the threshold changing pattern in this embodiment. FIG. 5A indicates an example of time-dependent change of at least one of the decelerations $G_{SL}$, $G_{SR}$ detected based on the output signals of the satellite sensors 16, 18. FIG. 5B indicates time-dependent change of the switching of the threshold changing pattern. In FIGS. 5A and 5B, a solid line indicates a case where a deceleration $G_{SL}$, $G_{SR}$ continues for a relatively long period, and a broken line indicates a case where a deceleration $G_{SL}$, $G_{SR}$ ends within a short period. In this embodiment, it is assumed that each of the decelerations $G_{SL}$, $G_{SR}$ is detected at every predetermined sampling time T1 (e.g., 0.5 ms).

As indicated in FIGS. 5A and 5B, at a time point (t0–T1), the decelerations $G_{SL}$, $G_{SR}$ based on the outputs signal of the satellite sensors 16, 18 are less than the first predetermined value $G_{S1}$, and therefore the threshold changing pattern is set to the Hi map. If at least one of the decelerations $G_{SL}$, $G_{SR}$ reaches the third predetermined value Gs3 from the aforementioned state at a time point t0, the threshold changing pattern is switched from the Hi map to the Lo1 map. Then, if the deceleration $G_{SL}$, $G_{SR}$ remains at the third predetermined value $G_{S3}$ at the elapse of the sampling time T1 (at a time point t1), the threshold changing pattern is switched from the Lo1 map to the Lo2 map. If the deceleration $G_{SL}$, $G_{SR}$ still remains at the third predetermined value $G_{S3}$ at the second elapse of the sampling time T1 (at a time point t2), the threshold changing pattern is switched from the Lo2 map to the Lo3 map.

However, if at the time point t1 the deceleration $G_{SL}$, $G_{SR}$ does not remain at the third predetermined value $G_{S3}$ but becomes less than the second predetermined value $G_{S2}$, the threshold changing pattern of the Lo1 map is maintained. Likewise, if at the time point t2 the deceleration $G_{SL}$, $G_{SR}$ becomes less than the third predetermined value $G_{S3}$, the threshold changing pattern of the Lo2 map is maintained.

According to this process, even if at least one of the decelerations $G_{SL}$, $G_{SR}$ detected based on the output signals of the satellite sensors 16, 18 greatly changes, the threshold changing pattern is not immediately switched to a desired pattern, but is sequentially switched one step at a time. Then, if the deceleration $G_{SL}$, $G_{SR}$ continues for a predetermined period, the threshold changing pattern is finally switched to a desired changing pattern corresponding to the deceleration $G_{SL}$, $G_{SR}$.

Figure 6:
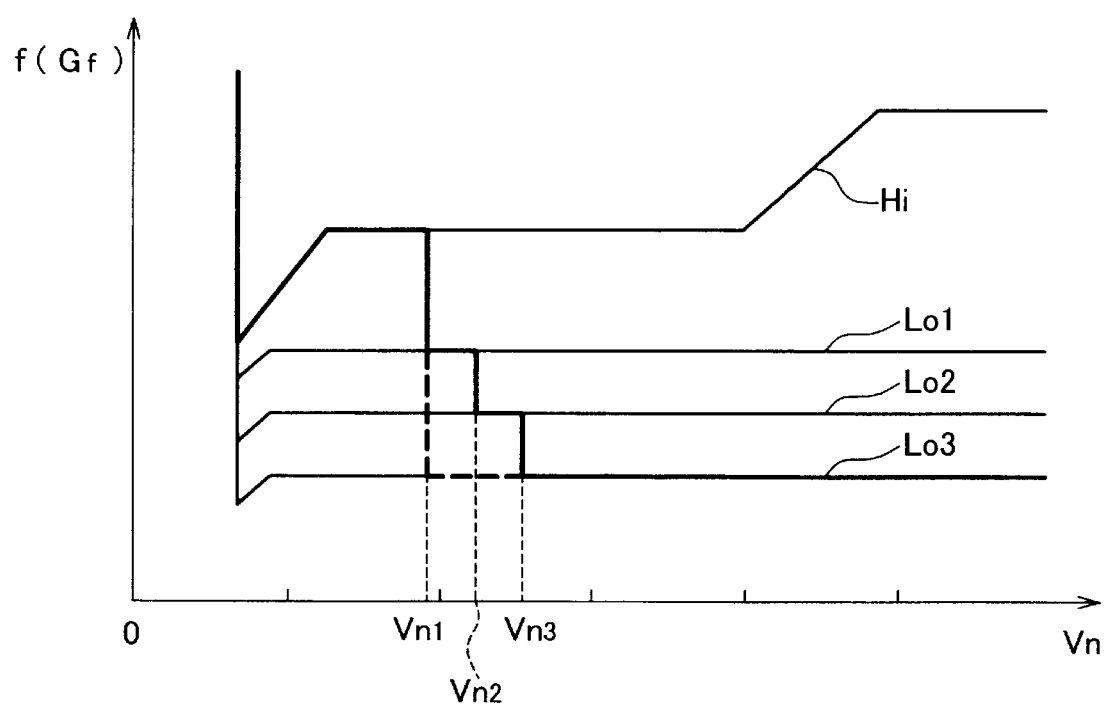
FIG. 6 is a diagram indicating a relationship between the calculated value f(Gf) and the speed Vn realized when the threshold changing pattern is switched as indicated in FIG. 5B.

FIG. 6 shows a diagram indicating a relationship between the speed Vn and the calculated value f(Gf) realized when the threshold changing pattern is switched as indicated in FIG. 5B. In FIG. 6, a solid bold line indicates the switching of the threshold changing pattern realized by performing the process of the embodiment, and a broken bold line indicates the switching of the threshold changing pattern realized when the process of the embodiment is not performed.

If the speed Vn is Vn1 at the time point of establishment of a circumstance that causes the threshold changing pattern to be switched, for example, from the Hi map to the Lo3 map, the threshold changing pattern is immediately switched from the Hi map to the Lo3 map in a construction in which the threshold changing pattern is immediately changed to a desired pattern as indicated by the broken bold line in FIG. 6. In this construction, the calculated value f(Gf) and the threshold value on the Lo3 map in the case where the speed Vn is Vn1 are compared. From then on, the two values are compared with reference to the Lo3 map. As a result, the airbag apparatus 30 is activated if the calculated value f(Gf) corresponding to the speed Vn exceeds the threshold on the Lo3 map.

On the other hand, in a construction where the threshold changing pattern is switched stepwise at every predetermined time T1 and where the threshold changing pattern is switched to a desired changing pattern corresponding to the deceleration $G_{SL}$, $G_{SR}$ as in the embodiment if the deceleration $G_{SL}$, $G_{SR}$ continues for a predetermined period, the threshold changing pattern of, for example, the Hi map, is first switched only to the Lo1 map as indicated by the solid bold line in FIG. 6. After that, if the circumstance that causes the switching of the threshold changing pattern to the Lo3 map remains at the elapse of the sampling time T1, the threshold changing pattern is switched from the Lo1 map to the Lo2 map at that time point provided that the speed Vn is Vn2 at that time point. If at the second elapse of the sampling time T1, the circumstance that allows the switching of the threshold changing pattern to the Lo3 map still remains, the threshold changing pattern is switched from the Lo2 map to the Lo3 map at time point provided that the then speed Vn is Vn3.

Therefore, according to the construction of the embodiment, if the speed Vn is Vn1, the calculated value f(Gf) and the threshold on the Lo1 map at that time are compared. If the speed Vn is Vn2, the calculated value f(Gf) and the threshold on the Lo2 map at that time are compared. If the speed Vn is Vn3, the calculated value f(Gf) and the threshold on the Lo3 map at that time are compared. Thus, according to the embodiment, even under a circumstance where the threshold changing pattern can be greatly shifted due to noises being superimposed on the output signals of the satellite sensors 16, 18, it is possible to prevent the airbag apparatus 30 from becoming undesirably prone to be activated and therefore significantly prevent undesired deployment of the airbag 36. As a result, in the embodiment, the airbag apparatus 30 is properly activated.

Figure 7:
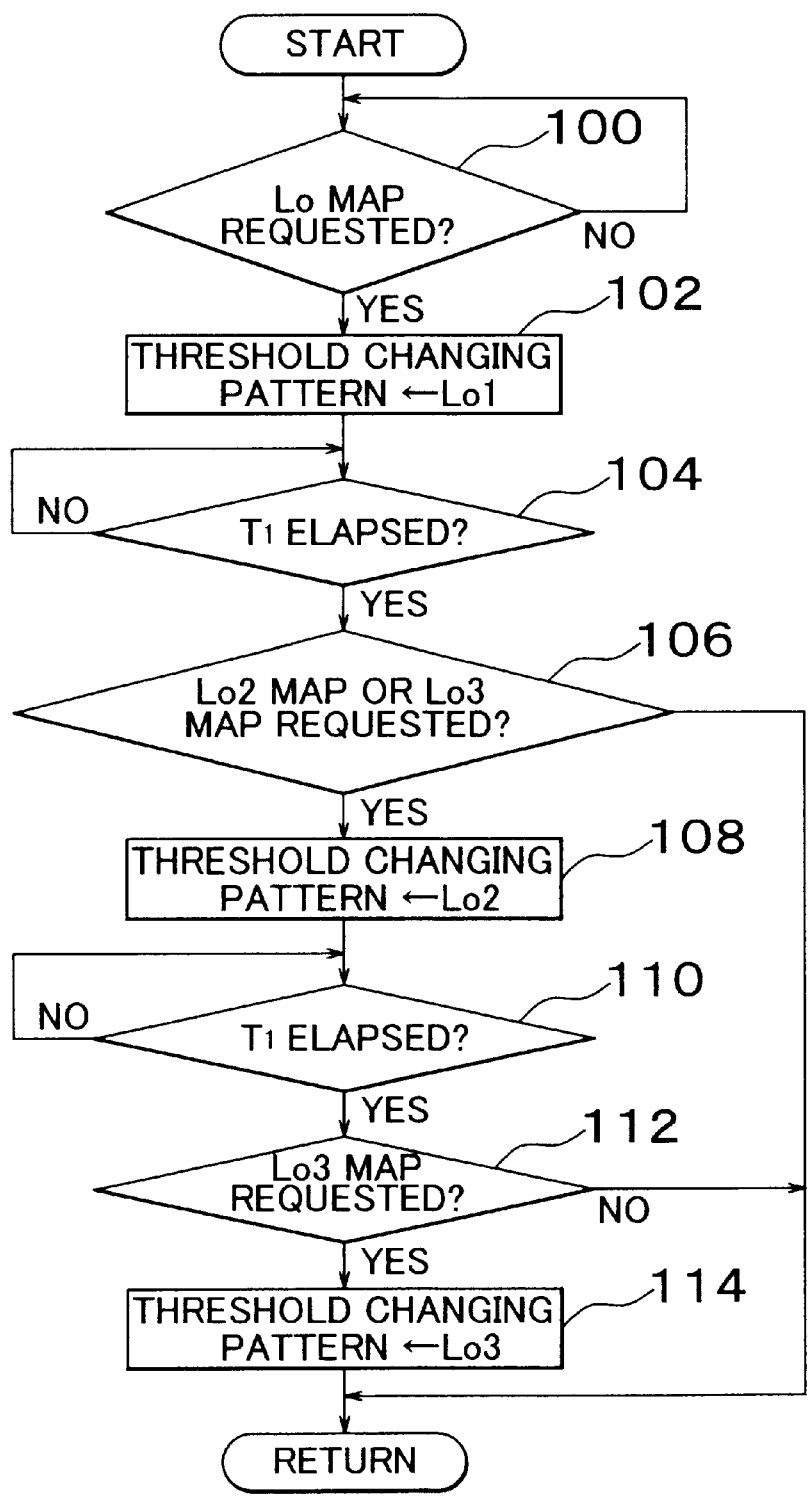
FIG. 7 is a flowchart illustrating a control routine executed when the threshold changing pattern is to be switched in the embodiment.

FIG. 7 is a flowchart illustrating a control routine executed by the ECU 12 when the threshold changing pattern is to be switched in this embodiment. The routine illustrated in FIG. 7 is a routine started every time the process ends. When the routine illustrated in FIG. 7 is started, the processing of step 100 is executed.

In step 100, it is determined whether any one of the Lo1 to Lo3 maps is requested as a threshold changing pattern, based on the decelerations $G_{SL}$, $G_{SR}$ detected based on the output signals of the satellite sensors 16, 18. The processing of step 100 is repeatedly executed until it is determined that the aforementioned condition is met. If it is determined that one of the Lo1 to Lo3 maps is requested as a threshold changing pattern as a result of the processing of step 100, the processing of step 102 is subsequently executed.

In step 102, the processing of switching the threshold changing pattern from the Hi map to the Lo1 map is executed. If the processing of step 102 is executed, the threshold on the Lo1 map and a value determined based on the relationship between the calculated value f(Gf) and the speed Vn are compared from then on.

In step 104, it is determined whether the sampling time T1 has elapsed following the execution of the processing of step 102. The processing of step 104 is repeatedly executed until it is determined that the sampling time T1 has elapsed. If it is determined that the sampling time T1 has elapsed as a result of the processing of step 104, the processing of step 106 is subsequently executed.

In step 106, it is determined whether either the Lo2 map or the Lo3 map is requested as a threshold changing pattern, based on the decelerations $G_{SL}$, $G_{SR}$ detected based on the output signals of the satellite sensors 16, 18 at the time point when it is determined in step 104 that the sampling time T1 has elapsed. If neither the Lo2 map nor the L03 map is requested, there is no need to shift the threshold changing pattern below the Lo1 map because the Hi map or the Lo1 map has been requested. Therefore, if such a determination is made, the present execution of the routine is ended. Conversely, if the Lo2 map or the Lo3 map is requested, it is appropriate to shift the threshold changing pattern below the Lo1 map. Therefore, if such a determination is made, the processing of step 108 is subsequently executed.

In step 108, the processing of switching the threshold changing pattern from the Lo1 map to the Lo2 map is executed. If the processing of step 108 is executed, the threshold on the Lo2 map is compared with a value determined from the relationship between the calculated value f(Gf) and the speed Vn.

In step 110, it is determined whether the sampling time T1 has elapsed following the execution of the processing of step 108. The processing of step 110 is repeatedly executed until it is determined that the sampling time T1 has elapsed. If it is determined that the sampling time T1 has elapsed as a result of the processing of step 110, the processing of step 112 is subsequently executed.

In step 112, it is determined whether the Lo3 map is requested as a threshold changing pattern, based on the decelerations $G_{SL}$, $G_{SR}$ detected based on the output signals of the satellite sensors 16, 18 at the time point when it is determined in step 110 that the sampling time T1 has elapsed. If the Lo3 map is not requested, there is no need to shift the threshold changing pattern below the Lo2 map because one of the Hi map, the Lo1 map and the Lo2 map has been requested. Therefore, if such a determination is made, the present execution of the routine is ended. Conversely, if the Lo3 map is requested, it is appropriate to switch the threshold changing pattern from the Lo2 map to the Lo3 map. Therefore, if such a determination is made, the processing of step 114 is subsequently executed.

In step 114, the processing of switching the threshold changing pattern from the Lo2 map to the Lo3 map is executed. If the processing of step 114 is executed, the threshold on the Lo3 map and a value determined from the relationship between the calculated value f(Gf) and the speed Vn are compared from then on. When the processing of step 114 ends, the present execution of the routine is ended.

According to the above-described process, in a case where while the Hi map, which serves as a reference, has been set as a threshold changing pattern, at least one of the decelerations $G_{SL}$, $G_{SR}$ detected based on the output signals of the satellite sensors 16, 18 reaches a value that allows the Lo2 map to be selected and set, the threshold changing pattern can be switched to the Lo2 map after the aforementioned case continues for a time corresponding to a difference between the Hi map and the Lo2 map (more specifically, a length of time during which the deceleration $G_{SL}$, $G_{SR}$ that allows the Lo2 map to be set is detected consecutively twice). Furthermore, in a case where while the Hi map, which serves as a reference, has been set as a threshold changing pattern, at least one of the decelerations $G_{SL}$, $G_{SR}$ detected based on the output signals of the satellite sensors 16, 18 reaches a value that allows the Lo3 map to be selected and set, the threshold changing pattern can be switched to the Lo3 map after the aforementioned case continues for a time corresponding to a difference between the Hi map and the Lo3 map (more specifically, a length of time during which the deceleration $G_{SL}$, $G_{SR}$ that allows the Lo3 map to be set is detected consecutively three times).

Thus, according to this embodiment, in a case where at least one of the decelerations $G_{SL}$, $G_{SR}$ considerably changes, the threshold changing pattern is not switched to a changing pattern corresponding to the deceleration $G_{SL}$, $G_{SR}$ unless the changed deceleration $G_{SL}$, $G_{SR}$ continues for a length of time corresponding to the magnitude of the change in the deceleration $G_{SL}$, $G_{SR}$. That is, if at least one of the decelerations $G_{SL}$, $G_{SR}$ considerably changes, it is required that the changed deceleration $G_{SL}$, $G_{SR}$ continue for a period lengthened in accordance with the changed deceleration $G_{SL}$, $G_{SR}$ in order to switch the threshold changing pattern to a changing pattern corresponding to the deceleration $G_{SL}$, $G_{SR}$. Therefore, if it is determined that at least one of the decelerations $G_{SL}$, $G_{SR}$ is great due to noises being superimposed on the output signal of the satellite sensor 16, 18, the unnecessary switching of the threshold changing pattern is prevented, so that a great downshift of the threshold changing pattern can be avoided. Hence, according to the embodiment, it is possible to avoid an event that if noises are superimposed on the output signal of at least one of the satellite sensors 16, 18, the airbag apparatus 30 becomes prone to be activated. Therefore, inadvertent deployment of the airbag 36 can be substantially prevented, and activation of the airbag apparatus 30 can be properly performed.

Furthermore, according to the above-described process, if while the Hi map, which serves as a reference, has been set as a threshold changing pattern, at least one of the decelerations $G_{SL}$, $G_{SR}$ detected based on the output signals of the satellite sensors 16, 18 reaches a value that allows the Lo2 map or the Lo3 map to be selected and set, the switching of the threshold changing pattern from the Hi map to the Lo2 map or the Lo3 map can be conducted sequentially in a step-by-step manner at every sampling time T1.

In the aforementioned case, the threshold changing pattern is not immediately switched from the Hi map to the Lo2 map or the Lo3 map after the state where the deceleration $G_{SL}$, $G_{SR}$ is at a value that allows the Lo2 map or the Lo3 map to be selected or set continues for a predetermined time. Instead, even before the state has continued for the predetermined time, the threshold changing pattern is switched from the Hi map to the side of the Lo3 map. Therefore, an event that the airbag apparatus 30 becomes undesirably less prone to be activated is avoided. Therefore, according to the embodiment, degradation of responsiveness of the threshold changing pattern can be substantially prevented. Hence, the airbag apparatus 30 can be further properly activated.

Furthermore, as described above, according to the embodiment, the satellite sensors 16, 18 are designed so that even if an impact on the vehicle 10 discontinues within a short time, the satellite sensors 16, 18 continue to output a signal corresponding to the impact for at least a predetermined time. With such a design, even if an impact on the vehicle 10 discontinues within a short time, the satellite sensors 16, 18 output a signal corresponding to the impact for a relatively long period. It should be noted herein that noises that can be superimposed on the output signals of the satellite sensors 16, 18 usually do not continue for a long period.

Therefore, even if an impact on the vehicle 10 discontinues within a short time, the output signals of the satellite sensors 16, 18 can be outputted distinguishably from noise-superimposed output signals. Hence, if at least one of the decelerations $G_{SL}$, $G_{SR}$ changes due to an impact given to the vehicle 10, the threshold changing pattern can be reliably switched to a changing pattern corresponding to the impact. According to the embodiment, therefore, it is possible to avoid an event that even though a great impact occurs on the vehicle 10, the threshold changing pattern is not switched to a changing pattern corresponding to the impact. Thus, the airbag apparatus 30 can be properly activated.

In the foregoing embodiment, the floor sensor 14 corresponds to "first sensor" in the invention. The satellite sensors 16, 18 correspond to "second sensor" in the invention. The speed Vn and the calculated value f(Gf) determined through a predetermined calculation with the deceleration Gf detected based on the floor sensor 14 correspond to "parameter" in the invention. The sampling time T1 corresponds to "predetermined time" in the invention.

Furthermore, in the foregoing embodiment, the ECU 12 realizes "threshold setting means" and "threshold changing pattern setting means" in the invention by selecting and setting the Hi map, the Lo1 map, the Lo2 map or the Lo3 map as a threshold changing pattern based on the decelerations $G_{SL}$, $G_{SR}$ detected based on the output signals of the satellite sensors 16, 18. The ECU 12 realizes "activation control means" in the invention by supplying a drive signal from the input-output circuit 20 to the drive circuit 32 of the airbag apparatus 30 if a value determined from the relationship between the calculated value f(Gf) and the speed Vn exceeds a threshold SH. The ECU 12 realizes "threshold switching means" and "threshold changing pattern switching means" in the invention by executing the processing of step 108 or 114. The ECU 12 realizes "threshold switching aborting means" and "threshold changing pattern switching aborting means" in the invention by avoiding execution of the processing of step 108 after negative determination is made in step 106, and by avoiding execution of the processing of step 114 after negative determination is made in step 112.

According to the foregoing embodiment, if at least one of the decelerations $G_{SL}$, $G_{SR}$ detected based on the output signals of the satellite sensors 16, 18 considerably changes, the threshold changing pattern is switched stepwise at every elapse of the sampling time T1. However, such an arrangement does not limit the invention. In the invention, any arrangement is possible if the arrangement allows the threshold changing pattern to be switched stepwise at every predetermined time.

Although in the foregoing embodiment, the threshold changing pattern is set to a map selected from the Hi map, the Lo1 map, the Lo2 map and the Lo3 map, any arrangement is possible provided that the arrangement allows a map to be selected from at least three maps and be set as a threshold changing pattern.

Furthermore, in the foregoing embodiment, the satellite sensors 16, 18 are constructed so that even if an impact on the vehicle 10 discontinues within a short time, the satellite sensors 16, 18 continue to output a signal corresponding to the impact for at least a predetermined time. The predetermined time may be any length of time if it allows the output signal of the satellite sensors 16, 18 to be distinguished from noises superimposed on the output signal.

Still further, in the foregoing embodiment, in a process of switching the threshold changing pattern from the Hi map, which serves as a reference, to the Lo2 map or the Lo3 map, the switching is conducted stepwise, and the threshold changing pattern is switched to the Lo2 map or the Lo3 map if a state that allows the Lo2 map or the Lo3 map to be set as a threshold changing pattern continues for a predetermined period. However, this arrangement does not restrict the invention. For example, the invention is also applicable to the reverse switching where the threshold changing pattern is switched from the Lo2 map or the Lo3 map to the Hi map.

While the present invention has been described with reference to what is presently considered to be a preferred embodiment thereof, it is to be understood that the invention is not limited to the disclosed embodiment or constructions. To the contrary, the invention is intended to cover various modifications and equivalent arrangements.

What is claimed is:

1. An activation control apparatus of an airbag apparatus, comprising:
   a first sensor that is disposed at a predetermined position in a vehicle body and that outputs a signal corresponding to an impact that occurs on a vehicle;
   an activation control means for activating the airbag apparatus if a parameter based on the signal outputted by the first sensor exceeds a predetermined threshold;
   a second sensor that is disposed forward of the predetermined position of the first sensor within the vehicle body and that outputs a signal corresponding to an impact that occurs on the vehicle;
   threshold setting means for setting one value of at least three values as the predetermined threshold based on the signal outputted by the second sensor; and
   threshold switching means for, if the one value of the at least three values has been set as the predetermined threshold by the threshold setting means, switching the predetermined threshold to another value of the at least three values, wherein the threshold switching means switches to the another value after the second sensor continues for a predetermined time to output a signal for which the threshold setting means sets the predetermined threshold to the another value, and further wherein the predetermined time is based on a difference between the one value and the another value.

2. An activation control apparatus according to claim 1, wherein the threshold switching means switches the predetermined threshold stepwise at each of a plurality of predetermined times if the second sensor continues to output a signal for which the threshold setting means sets the predetermined threshold to the another value, wherein the plurality of predetermined times are based on the difference between the one value and the another value.

3. An activation control apparatus according to claim 2, further comprising threshold switching aborting means for aborting switching of the predetermined threshold to the another value if the state where the another value is to be set as the predetermined threshold discontinues before the predetermined threshold is switched to the another value by the threshold switching means.

4. An activation control apparatus according to claim 1, wherein the second sensor continues to output a signal for at least a predetermined time.

5. An activation control apparatus of an airbag apparatus, comprising:
   a first sensor that is disposed at a predetermined position in a vehicle body and that outputs a signal corresponding to an impact that occurs on a vehicle;
   an activation control means for activating the airbag apparatus if a parameter based on the signal outputted by the first sensor exceeds a predetermined threshold;
   a second sensor that is disposed forward of the predetermined position of the first sensor within the vehicle body and that outputs a signal corresponding to an impact that occurs on the vehicle;
   threshold changing pattern setting means for setting one changing pattern of at least three changing patterns as the predetermined threshold based on the signal outputted by the second sensor; and
   threshold changing pattern switching means for, if the one changing pattern of the at least three changing patterns has been set as the predetermined threshold changing pattern by the threshold changing pattern setting means, switching the predetermined threshold changing pattern to another changing pattern of the at least three changing patterns, wherein the threshold changing pattern switching means switches to the another changing pattern after the second sensor continues for a predetermined time to output a signal for which the threshold changing pattern setting means sets the predetermined threshold changing pattern to the another changing pattern, and further wherein the predetermined time is based on a difference between the one changing pattern and the another changing pattern.

6. An activation control apparatus according to claim 5, wherein the threshold changing pattern switching means switches the predetermined threshold changing pattern stepwise at each of a plurality of predetermined times if the second sensor continues to output a signal for which the threshold changing pattern setting means sets the predetermined threshold changing pattern to the another changing pattern, wherein the plurality of predetermined times are based on the difference between the one changing pattern and the another changing pattern.

7. An activation control apparatus according to claim 6, further comprising threshold changing pattern switching aborting means for aborting switching of the predetermined threshold changing pattern to the another changing pattern if the state where the another changing pattern is to be set as the predetermined threshold changing pattern discontinues before the predetermined threshold changing pattern is switched to the another changing pattern by the threshold changing pattern switching means.

8. An activation control apparatus according to claim 5, wherein the second sensor continues to output a signal for at least a predetermined time.

9. An activation control method for an airbag apparatus including a first sensor that is disposed at a predetermined position in a vehicle body and that outputs a signal corresponding to an impact that occurs on a vehicle, activation control means for activating the airbag apparatus if a parameter based on the signal outputted by the first sensor exceeds a predetermined threshold, and a second sensor that is disposed forward of the predetermined position of the first sensor within the vehicle body and that outputs a signal corresponding to an impact that occurs on the vehicle, the method comprising the steps of:
   setting one value of the at least three values as the predetermined threshold based on the signal outputted by the second sensor; and if the one value of the at least three values has been set as the predetermined threshold by the threshold setting means, switching the predetermined threshold to another value of the at least three values, wherein the threshold switching means switches to the another value after the second sensor continues for a predetermined time to output a signal for which the threshold setting means sets the predetermined threshold to the another value, and further wherein the predetermined time is based on a difference between the one value and the another value.

10. An activation control method according to claim 9, wherein the predetermined threshold is switched stepwise at each of a plurality of predetermined times if the second sensor continues to output a signal for which the threshold setting means sets the predetermined threshold to the another value, wherein the plurality of predetermined times are based on the difference between the one value and the another value.

11. An activation control method according to claim 10, further comprising aborting switching of the predetermined threshold to the another value if the state where the another value is to be set as the predetermined threshold discontinues before the predetermined threshold is switched to the another value.

12. An activation control method according to claim 9, wherein the second sensor continues to output a signal for at least a predetermined time.

13. An activation control method for an airbag apparatus including a first sensor that is disposed at a predetermined position in a vehicle body and that outputs a signal corresponding to an impact that occurs on a vehicle, activation control means for activating the airbag apparatus if a parameter based on the signal outputted by the first sensor exceeds a predetermined threshold, and a second sensor that is disposed forward of the predetermined position of the first sensor within the vehicle body and that outputs a signal corresponding to an impact that occurs on the vehicle, the method comprising the steps of:

setting one changing pattern of the at least three changing patterns as the predetermined threshold changing pattern based on the signal outputted by the second sensor; and if the one changing pattern of the at least three changing patterns has been set as the predetermined threshold changing pattern, switching the predetermined threshold changing pattern to another changing pattern of the at least three changing patterns, wherein the threshold changing pattern switching means switches to the another changing pattern after the second sensor continues for a predetermined time to output a signal for which the threshold changing pattern setting means sets the predetermined threshold changing pattern to the another changing pattern, and further wherein the predetermined time is based on a difference between the one changing pattern and the another changing pattern.

14. An activation control method according to claim 13, wherein the threshold changing pattern is switched stepwise at each of a plurality of predetermined times if the second sensor continues to output a signal for which the threshold changing pattern setting means sets the predetermined threshold changing pattern to the another changing pattern, wherein the plurality of predetermined times are based on the difference between the one changing pattern and the another changing pattern.

15. An activation control method according to claim 14, further comprising aborting switching of the predetermined threshold changing pattern to the another changing pattern if the state where the another changing pattern is to be set as the predetermined threshold changing pattern discontinues before the predetermined threshold changing pattern is switched to the another changing pattern.

16. An activation control method according to claim 13, wherein the second sensor continues to output a signal for at least a predetermined time.

17. An activation control apparatus of an airbag apparatus, comprising:

a first sensor that is disposed at a predetermined position in a vehicle body and that outputs a signal corresponding to an impact that occurs on a vehicle;

an activation control means for activating the airbag apparatus if a parameter based on the signal outputted by the first sensor exceeds a predetermined threshold;

a second sensor that is disposed forward of the predetermined position of the first sensor within the vehicle body and that outputs a signal corresponding to an impact that occurs on the vehicle;

wherein the controller sets one value of at least three values as the predetermined threshold based on the signal outputted by the second sensor, and if the one value of the at least three values has been set as the predetermined threshold, the controller switches the predetermined threshold to another value of the at least three values wherein the threshold switching means switches to the another value after the second sensor continues for a predetermined time to output a signal for which the threshold setting means sets the predetermined threshold to the another value, and further wherein the predetermined time is based on a difference between the one value and the another value.

18. An activation control apparatus of an airbag apparatus, comprising:

a first sensor that is disposed at a predetermined position in a vehicle body and that outputs a signal corresponding to an impact that occurs on a vehicle;

an activation control means for activating the airbag apparatus if a parameter based on the signal outputted by the first sensor exceeds a predetermined threshold;

a second sensor that is disposed forward of the predetermined position of the first sensor within the vehicle body and that outputs a signal corresponding to an impact that occurs on the vehicle;

wherein the controller sets one changing pattern of at least three changing patterns as the predetermined threshold changing pattern based on the signal outputted by the second sensor, and if the one changing pattern of the at least three changing patterns has been set as the predetermined threshold changing pattern, the controller switches the predetermined threshold changing pattern to another changing pattern of the at least three changing patterns, wherein the threshold changing pattern switching means switches to the another changing pattern after the second sensor continues for a predetermined time to output a signal for which the threshold changing pattern setting means sets the predetermined threshold changing pattern to the another changing pattern, and further wherein the predetermined time is based on a difference between the one changing pattern and the another changing pattern.

* * * * *